United States Patent

[11] 3,590,335

| [72] | Inventor | Claude R. Tetar<br>Paris, France |
| [21] | Appl. No. | 883,098 |
| [22] | Filed | Dec. 8, 1969 |
| [45] | Patented | June 29, 1971 |
| [73] | Assignee | L'Electronique Appliquee<br>Montrouge, France |
| [32] | Priority | Dec. 10, 1968 |
| [33] | | France |
| [31] | | 177,380 |

[54] AUTOMATIC CONTROL DEVICE FOR IRRIGATING, SPRAYING AND SPRINKLING
12 Claims, 1 Drawing Fig.

[52] U.S. Cl. .................................................. 317/148.5,
239/64
[51] Int. Cl. ...................................................... H01h 47/32
[50] Field of Search ............................................. 239/62–
—70; 317/141, 142, 135, 157, 148.5; 307/308,
116; 340/420

[56] References Cited
UNITED STATES PATENTS

| 2,989,667 | 6/1961 | Swink | 317/142 |
| 3,224,676 | 12/1965 | Rauchwerger | 239/66 X |
| 3,235,860 | 2/1966 | Vassil | 317/135 X |
| 3,361,356 | 1/1968 | Johnson et al. | 239/63 |

FOREIGN PATENTS

| 1,047,152 | 11/1966 | Great Britain | 340/420 |

Primary Examiner—Milton O. Hirshfield
Assistant Examiner—Ulysses Weldon
Attorney—Kemon, Palmer & Estabrook ABSTRACT: Apparatus for the automatic control of irrigating or spraying or sprinkling devices includes electrical sensors which are independently responsive to temperature, ambient lighting and actual moisture content of the soil. The output of these sensors is compared to preset reference standards and the resulting signals used to control the application of water to the soil or plants or trees.

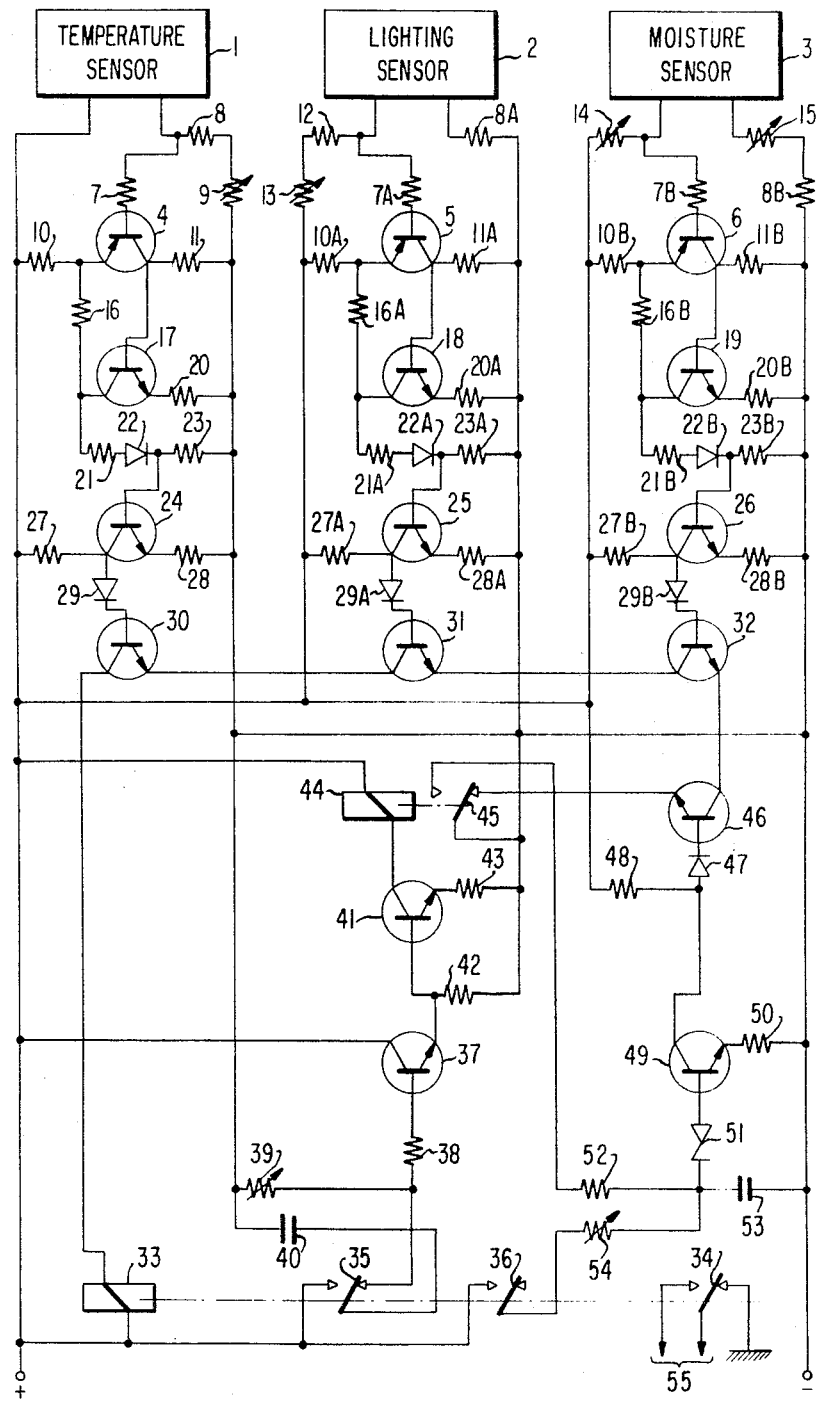

AUTOMATIC CONTROL DEVICE FOR IRRIGATING, SPRAYING AND SPRINKLING

The present invention concerns an improved automatic control device for controlling irrigation of culture bearing soils, including utilitarian as well as flowery and ornamental cultures, and also for controlling sprinkling of flowers and branches.

An object of the invention is to provide a control device which will yield a rational watering taking into account inter alia the local climate conditions, the nature of the cultures and of the soils, and of the effects sought by such a rational control of irrigation and/or spraying and/or sprinkling.

Whatever the end use, i.e., irrigation, spraying or sprinkling, the main parameters to be considered are as follows:

a. outside temperature: as generally known, irrigation may cause damage to cultures when made in the evening or at nightfall when the outside temperature is such as to yield night frosts, and quite similarly, when made during cloudy weather with a temperature neighboring zero or lower than 0° centigrade; similar damages would be caused to flowers and young branches when sprinkled in such conditions. On the other hand, it is known, mainly in fruit-tree gardens, to proceed with a spray when the evening temperature is low in order to protect the buds and flowers of such trees, by a thin film of frosted ice during the night;

b. ambient lighting: as also known, in nearly most cases, it is deleterious to proceed with watering in full sun; watering should be made in the evening or at nightfall, or during cloudy weather; in certain cases, a night watering may be advisable;

c. concerning soil irrigation, a third important parameter is the amount of moisture in the soil, its nature and that of the associated cultures being taken into due account; as irrigation has for its purpose to bring water moisture within the soil at the root level, it is important not to "drown" at this level.

A device according to the present invention may be broadly characterized as comprising means for sensing the above three parameters by appropriate sensors or probes which yield electrical output signals, means for comparing such signals to preestablished, and adjustable, reference values, and for initiating an automatic admission of water into the irrigating, spraying and/or sprinkling apparatus, during an equally preset and adjustable length of time when, and only when the complete set of reference conditions are satisfied.

According to another feature of the invention, the device embodies means for preventing a further admission of water to the apparatus prior to a preset lapse of time after the first watering cycle.

According to a further feature of the invention, said device may also embody means for renewing the watering cycle during a further preset length of time following the preset lapse.

These and further features of devices according to the present invention will now be described in detail with reference to one embodiment thereof shown on the single FIGURE of the accompanying drawings. From this embodiment, one may plainly deduce any technological variations within the scope of the appended claims.

The illustrated example concerns irrigation and the modification for sprinkling alone will be explained hereinafter. The device comprises a temperature sensor or probe, an ambient lighting sensor or probe and a soil moisture sensor or probe. Each of the probes converts the measurement of the concerned parameter into a corresponding electric signal.

The temperature sensing probe is indicated at 1 and measures the outside air temperature (under shelter of course). Conveniently this probe may be a negative temperature coefficient thermistor circuit. A positive DC voltage is applied to the probe from a DC or rectified supply, indicated in the drawing only by the polarity markings. The other terminal of the probe 1 is connected to the base of a transistor 4, of the NPN type for instance, through a series resistor 7. The negative supply voltage is applied to the connecting point between probe and resistor 7 through a series network comprised of a potentiometer 9 and a series resistor 8, the latter for matching the impedances of the probe and the potentiometer. Of course, the relative positions of 8 and 9 may be reversed if desired. Transistor 4 is connected by its emitter to the positive supply through resistor 10 and by its collector to the negative supply through resistor 11. The adjustment of the potentiometer 9, which may be graduated in centigrade temperature degrees for instance defines an operating threshold which functions as follows: as long as the resistance value of the probe 1 remains higher than that corresponding to the value set on the potentiometer 8—9, transistor 4 is blocked by the positive voltage applied to its base. When, on the other hand, the resistance of the probe increases to a point where the positive voltage through the probe no longer compensates for the negative voltage, i.e., when the temperature gets lower than the reference value preset on the potentiometer, transistor 4 becomes conductive.

In the first condition, i.e. with transistor 4 blocked, a transistor 17 which is connected by its base to the collector output of 4, and the collector of which is connected to the positive supply through serially connected resistors 16 and 10, i.e. to the emitter of 4 through resistor 16, and the emitter of which is connected to the negative supply through resistor 20, is in its conducting condition. Transistor 24, on the other hand, the base of which is connected to a tap of the voltage divider 21—22—23 inserted between the collector of 17 and the negative supply past diode 22, and the emitter of which is connected to the negative supply through resistor 28, its collector being connected to the positive supply through resistor 27, is blocked, which condition isolates the base of a transistor 30. Transistor 30 is one element of an electrical current gate and, in such a condition, it presents a low impedance path between its emitter and its collector corresponding to a "gate open" condition.

In the second condition, i.e. with 4 being unblocked, transistor 17 is blocked, transistor 24 is conducting and the "gate" is closed at 30 since 30 presents a high impedance path between its emitter and its collector, substantially inhibiting passage of electrical current therethrough.

Summarizing, "gate" is "open." i.e. conducting current when the ambient temperature is higher than the value set on the potentiometer 9, but is blocked when the ambient temperature is less than the setting of potentiometer 9.

When the device is to be used for sprinkling fruit-tree buds and flowers against night frosts, as explained, the conditions of gate 30 must be reversed, for instance, by inserting an inverting transistor stage between transistors 24 and 30.

The ambient lighting probe is indicated at 2. It may consist of a photocell, which may be of the photomultiplier type, having its cathode oriented towards the sky, preferably towards the North so as to avoid a direct impingement of solar rays. Preferably, said photocell is arranged at the bottom of a screening tube in order to protect the cell against level rays of the sun.

The probe 2 is connected across the supply to the positive supply terminal through a resistor 12 and a series connected potentiometer 13; to the negative terminal through a resistor 8A of similar purpose to resistor 8. That terminal of probe 2 connected to resistor 12 is also connected to the base of a transistor 5 through a series resistor 7A. The circuitry of said transistor is identical to that of transistor 4, as apparent from the use of same numerical references with the additions of the letter "A" for such circuits. Potentiometer 13 may be provided with a scale graduated in light units, in lux for instance, and is used to preset the value of ambient light chosen as a threshold under which the admission of water to the apparatus will be permitted. From transistor 5, the circuit proceeds through cascaded stages 18 and 25, ending with a "gate" 31, which must be in conducting condition only when the ambient light is less than threshold value preset by the potentiometer 13. The value of the resistance of a photocell is inversely proportional to incident lighting so that when resistance of the cell is low, resistance 7A is fed with a voltage sufficiently negative that transistor 5 conducts, gate 31 remaining nonconducting. When the ambient light on sensor 2 falls to a suitable value so that the negative voltage drop reaches a predetermined value, the base of transistor 5 reaches a positive value which blocks 5 and consequently gate 31 is rendered conductive.

Probe 3 is an hygrometric probe for deriving a voltage proportional to the actual moisture content of the soil. It may consist for instance of two chromium coated electrodes buried at a depth of the order of one meter and the upper electrode being buried at a level corresponding to the substantial average depth of the roots of the culture concerned. Each of the electrodes may have a horizontal span of 50 centimeters for example. Consequently, the probe 3 constitutes an ohmic resistance, the value of which varies with the water quantity which has soaked into the ground between the electrodes. The resistance value is inversely proportional to the degree of moisture in the soil.

The probe 3 is electrically connected in a manner similar to the probe 2, a potentiometer 15 enabling equilization of the bifilar line, which may be relatively long depending upon the location of the probe 3 with respect to the location of the control device. The terminal of 3 not connected to the negative supply is connected to the input resistor to the base of a transistor 6, the circuit of which is identical to that of transistors 4 and 5. A presettable potentiometer 14 is connected between the positive supply and the resistor 7. Through a cascade of transistor stages 19 and 26, "gate" 32 is controlled in such manner that as long as the moisture rate remains under the threshold value, gate 32 is opened, but closes as soon as this threshold value is reached.

The three collector-emitter paths of the gates 30, 31, and 32 are connected in a series circuit from the positive supply through the control winding of a relay 33 to the collector of a transistor 46. Relay 33 has three inverter contacts 34, 35 and 36. In the unenergized condition of the relay, contact 36 breaks a circuit through a potentiometer 54 to the base of a transistor 49 through a Zener-type diode 51. The emitter of transistor 49 is connected to the negative supply through a resistor 50 and its collector is connected to the positive supply through a load resistor 48. Its collector output is connected through a diode 47 to the base of a transistor 46, the collector of which is connected as hereinabove said to the emitter of gate 32. The emitter of 46 is connected to a contact of the inverter 45, of a relay 44. The energization coil of relay 44 is connected between the positive supply and the collector of a transistor 41, the emitter of which is connected to the negative supply through resistor 43 and the base connected to the emitter output, supplied with the negative supply voltage through resistor 42, of a further transistor 37, the collector of which is connected to the positive supply. Transistor 37 has its base connected through resistor 38 to the rest contact of the inverter 35 of relay 33.

The work contacts of inverters 35 and 36 of relay 33 are connected to the positive supply. The moving armature of the inverter 35 is connected to one electrode of a condenser 40, the other electrode of which is connected to the negative supply, and a potentiometer 39 is connected between the negative supply and the rest contact of said inverter 35.

The moving armature of the inverter 45 of relay 44 is connected to the negative supply. The work contact of this inverter is connected through a resistor 52 to the connecting point between the potentiometer 54 and the Zener diode 51. A condenser 53 is connected between the same connecting point and the negative supply.

When the relay 44 is in its rest condition, as relay 33, transistor 49 is blocked and transistor 46 is conducting, its emitter-collector path then being of a lower impedance value. When in such condition the three gates 30, 31 and 32 are conducting, a circuit for an electrical current is set from the negative supply through the rest contact 45 of relay 44 and the emitter-collector path of 46, and the corresponding paths of gates 32, 31, 30 in series through the coil of relay 33 to the positive supply. Relay 33 is energized and actuates its inverter contacts. Inverter 34 closes an electrical circuit controlling valves which effect the admission of water to the various spraying and sprinkling heads and apparatus which are described on the surface to be irrigated.

When contact 36 comes to its work position, the positive supply is applied through potentiometer 54 on the condenser 53 which consequently progressively charges at a speed controlled by the time constant defined by the adjustment of said potentiometer 54. The time constant of this circuit may be adjusted for example from 0 up to 30 minutes. When condenser 53 reaches its maximum electrical charge, the Zener diode becomes conductive and the transistor 49 also passes to its conducting condition. So doing, it blocks transistor 46, which cuts off the energizing circuit for relay 33, which comes back to rest. Obviously, if one of the gates 30 to 32 has been previously closed, relay 33 will be brought back to rest; such an anticipated termination will be due mainly to the condition of gate 32 which will indicate that the soil has very quickly reached the desired moisture content.

With no premature operation of any of the probes for terminating a watering cycle, the three gates 30 to 32 remain conducting after the preset time is over, and condenser 53 finds a quick discharge circuit through 49 which is conducting. Once discharged, transistor 46 is restored to conduction. If no further means were provided, another cycle of irrigation would immediately be initiated since relay 33 immediately reenergizes. This, however, is not generally desirable as the water poured on the ground during the first cycle at the location of probe 3 may take some time to soak the soil between the electrodes of said probe. Overirrigation risks are obvious, and consequently risks of "drowning" the field and the roots of the cultures, and therefore the danger of rotting the roots.

In order to avoid these risks, it is desirable through not imperative to provide in all embodiments, as in the illustrated example, an additional circuit comprised of relay 44 and associated circuits thereto controlled from the inverter contact 35 of relay 33. When contact 35 is in its working condition, the positive supply is connected to a condenser 40 which has charged during the said first cycle of water feed to the irrigation apparatus. When relay 33 is deenergized, condenser 40 discharges through potentiometer 39 during a period of time, set by the adjustment of the time constant of the discharge by the setting of potentiometer 59. Here again, the time-constant may be of the order of 30 minutes. However, when contact 35 is in its rest position, the full potential of the condenser charge 40 is applied to transistor 37 which was conducting and this blocks transistor 37. Transistor 41, which was blocked, then becomes conducting and the energization circuit of relay 44 closes through 41. Inverter contact 45 of relay 44 now cuts off the supply of the emitter of transistor 46, which is blocked and consequently cuts the energization circuit of relay 33. This relay 33 consequently is maintained at rest as long as condenser 40 discharges. When the condenser is fully discharged, transistor 37 is brought to its conducting condition and transistor 41 blocks, reestablishing the conducting condition of 46. A new cycle may then proceed provided the probe 3 is still authorizing it, and so forth, until probe 3 measures an amount of moisture corresponding to the setting of potentiometer 14.

For pure sprinkling, without irrigation, a relay 44 is omitted as well as inverter contact 35 together with the circuits interconnecting these two components. The connection of the emitter of 46 to the negative supply is made permanent, and the probe 3, the gate 32 and their interlinking circuits may be omitted. Of course, it is now necessary to limit the operation to a single cycle. This may be done, for instance, by controlling from an additional inverter contact of 33 the condition of a "store" which, after having been placed to work and there again reset to rest, controls a relay cutting the connection of the coil of 33 to the positive supply. Such a store, which may consist of additional relay means, will of course have to be reset in some manner such as, but not limited to, manual operation prior to a further operation of the device.

I claim:

1. An automatic control device for controlling irrigation, spraying and sprinkling of cultures, by controlled release of water therefor, comprising in combination:

an electric sensor of ambient lighting;

an electric sensor of outside temperature;

means for establishing electrical reference values for ambient lighting and outside temperature;

comparator means for respectively comparing the outputs of said sensors with said reference values;

a logic circuit responsive to a set of predetermined conditions of the outputs of said comparator means;

relay means operated from the output of said logic circuit for controlling the said release of water;

and means activated from the output of said circuit for resetting said relay means after a determined length of time following their activation.

2. Device according to claim 1, including a further electric sensor, an electrical reference value thereof and comparator means therefor for sensing the moisture condition of the soil, the output of the said further comparator means being connected to a further input of said logic circuit.

3. Device according to claim 1, wherein said logic circuit is comprised of an AND circuit of the outputs of said comparator means.

4. Device according to claim 1, which further comprises a first time-constant circuit activated from the said output of said logic circuit and means controlled from said first time-constant circuit for resetting said relay means after a length of time substantially equal to its time constant from its activation.

5. Device according to claim 4, wherein said first time-constant circuit includes condenser charging means activated from the closure of a work contact in said relay means, and said means for resetting back said relay means include means responsive to the full charge of said condenser means for opening the energization circuit of said relay means.

6. Device according to claim 1, which further comprises a second time-constant circuit activated by the reset of said relay means and means controlled from said second time-constant circuit for inhibiting activation of said relay means during a time interval substantially equal to the time constant thereof.

7. Device according to claim 6, wherein said second time-constant circuit includes condenser charging means activated from a closure of a work contact in said relay means, condenser discharging means controlled by the reset to rest of a contact in said relay means and said means for inhibiting activation of said relay means includes further relay means cutting the energization circuit of said relay means up to the complete discharge of said condenser means.

8. Automatic device for controlling the water release in irrigation, spraying and sprinkling equipments for cultures, comprising in combination:

a plurality of electric sensor means, each adapted to measure the value of a distinctive environmental parameter to intervene in a decision of water release;

a corresponding plurality of transistor threshold circuits respectively driven from the outputs of said sensor means, each of said circuits including means for adjustably defining a reference threshold value;

a logic circuit having as many inputs as there are transistor threshold circuits respectively connected to the outputs of said threshold circuits;

a circuit for temporary energization for a relay coil in on-off control from the output of said logic circuit;

and contacts of said relay for further controlling water releasing means.

9. Device according to claim 8, wherein said logic circuit includes as many emitter-collector paths of transistor stages as there are threshold circuits, serially connected with the said energization relay coil across a DC supply.

10. Device according to claim 8, wherein at least one of said sensor means senses the ambient temperature parameter, at least one of said sensor means senses the ambient lighting parameter, and at least one of said sensor means senses the moisture of the soil at substantially the level of the roots of the cultures.

11. Device according to claim 9, wherein said series circuit further includes a transistor stage controlled from a resistance-condenser time-constant circuit and wherein a work contact of said relay controls the activation of said time-constant circuit, for blocking the energization of said relay after a predetermined time interval from the actuation to work thereof.

12. Device according to claim 9, wherein said series circuit further includes a further transistor stage controlled from a further relay actuated from a further time-constant circuit of the resistance-condenser type, means including a work contact of said water release controlling relay for charging said condenser, and means including a rest contact of said water release controlling relay for discharging said condenser through the energization coil of said further relay for blocking said further transistor stage during the said discharge.